United States Patent [19]

Shannon et al.

[11] 4,447,380
[45] May 8, 1984

[54] EXPANDED INORGANIC AGGREGATE BONDED WITH CALCIUM SILICATE HYDRATE AS THERMAL INSULATION

[75] Inventors: Richard F. Shannon, Lancaster; Jerry L. Helser, Hebron, both of Ohio

[73] Assignee: Owens-Corning Fiberglas Corporation, Toledo, Ohio

[21] Appl. No.: 331,445

[22] Filed: Dec. 16, 1981

[51] Int. Cl.$^3$ .............................................. C04B 13/10
[52] U.S. Cl. ........................................ 264/82; 264/86; 264/333
[58] Field of Search .............................. 264/86, 333, 82

[56] References Cited

U.S. PATENT DOCUMENTS

| | | | |
|---|---|---|---|
| 3,505,439 | 4/1970 | Moorehead | 264/333 |
| 3,562,084 | 2/1971 | Shannon | 264/333 |
| 3,590,111 | 6/1971 | Gebefugi | 264/234 |
| 3,634,567 | 1/1972 | Yang | 264/333 |
| 3,965,020 | 6/1976 | Noll | 264/333 |
| 4,298,561 | 11/1981 | Uchida | 264/333 |

Primary Examiner—John Parrish
Attorney, Agent, or Firm—Ronald C. Hudgens; Ted C. Gillespie; James B. Wilkens

[57] ABSTRACT

Rigid shaped articles of expanded inorganic aggregate, such as expanded perlite, bonded with calcium silicate hydrate and preferably reinforced with fibers, are made by mixing a hydrothermally reacted gel of calcium silicate hydrate crystals with the expanded aggregate, shaping and drying, without treatment with saturated steam after the gel and aggregate have been mixed.

17 Claims, No Drawings

EXPANDED INORGANIC AGGREGATE BONDED WITH CALCIUM SILICATE HYDRATE AS THERMAL INSULATION

FIELD OF THE INVENTION

This invention relates to the field of high temperature thermal insulation. More particularly it relates to the field of pre-shaped rigid bodies of thermal insulating material suitable for use at temperatures up to about 1200° to about 1800° F. (649° to 982° C.) are methods of making the same. One of the principal fields of use of such materials is in thermally insulating high pressure steam pipes and associated equipment.

BACKGROUND OF THE INVENTION

The use of pre-shaped rigid bodies of calcium silicate hydrates as high temperature thermal insulation has long been known, and several processes for the manufacture thereof are also known. Such prior practice has included heating aqueous slurries of reactive calcareous and siliceous materials under either atmospheric or super-atmospheric pressure to at least partially react said calcareous and siliceous materials. Where this initial (pre-shaping) reaction has been conducted at atmospheric pressure it has normally been found necessary to complete the hydrothermal reaction by treating the shaped ware with saturated steam at superatmospheric pressure in order to produce satisfactory products. In such processes the partially reacted and fluent slurry can be placed into so-called pan molds of desired shape and then cured in an autoclave while still in the pan molds and without preliminary dewatering. Alternatively, the partially reacted slurry can be shaped in so-called filter press molds of the desired configuration, with expression of sufficient aqueous medium therefrom to permit removal of the shaped ware from the mold for subsequent autoclaving to complete the hydrothermal cure reaction. However, where the initial (pre-shaping) hydrothermal reaction is carried out to sufficient completion in the presence of saturated steam at superatmospheric pressures, it has been suggested that it may be possible to omit such post-shaping treatment and to obtain satisfactory products by merely drying the shaped ware. Small amounts of fibrous reinforcement have frequently been included in these prior art hydrous calcium silicate products.

The use as high temperature thermal insulation of pre-shaped rigid bodies composed of expanded inorganic aggregate, such as expanded perlite or vermiculite, bonded with inorganic compositions such as alkali metal silicates, is also known. Such products can be manufactured by mixing the expanded aggregate with an aqueous solution of alkali metal silicate, compacting this mixture into the desired shape, curing (as by including a suitable curing agent and/or by heating) to insolubilize the binder and finally drying.

The use of a quasi-colloidal gel containing mixed crystals of calcium silicate hydrate, calcium aluminosilicate hydrate and calcium aluminate hydrate, made by reacting calcium oxide or hydroxide with perlite dust in a molar ratio of $SiO_2:CaO$ of about 1.1 to 2.0 in the presence of sufficient water to produce a dough-like material and subsequently adding more water and heating at 60°–95° C., as a bonding agent for expanded perlite and/or vermiculite has been disclosed in U.S. Pat. No. 3,590,111. The shaped ware requires autoclaving in saturated steam at superatmospheric pressures before drying to form the final rigid product. The pre-shaping reactions to form the binding agent gel are disclosed to be conducted at atmospheric pressure.

While certain of these prior art products, and the corresponding methods of producing them, have achieved a degree of commercial success, they have all been found to suffer from various deficiencies which the present invention largely overcomes. For example, calcium silicate hydrate products molded from slurries of calcareous and siliceous reactants which have not been reacted at superatmospheric pressures before molding require expensive and time-consuming post-curing in the presence of saturated steam at superatmospheric pressures. While such post-molding autoclaving may not always be required where a slurry of calcareous and siliceous reactants is sufficiently pre-reacted in the presence of saturated steam at superatmospheric pressure, it has been found difficult to consistently produce acceptable products by such processes and such pre-reacted calcium silicate hydrate gels release water very slowly so that press molding cycles are undesirably protracted. These problems are especially pronounced with products of low density. The prior art expanded inorganic aggregate products bonded with alkali silicate binders are found to suffer excessive erosion by abrasion in handling, installation and use, and to have lower compressive strength and impact resistance as compared to prior art calcium silicate hydrate products not containing expanded aggregate.

SUMMARY OF THE INVENTION

In one of its aspects the present invention is an improved method for making a shaped rigid article of thermal insulating material which comprises:
(a) heating an aqueous slurry of calcareous and siliceous reactants at a temperature of at least 100° C. under superatmospheric pressure to form, by hydrothermal reaction thereof, a gel of calcium silicate hydrate crystals;
(b) mixing additional material comprising thermally expanded inorganic aggregate with said gel to form a molding mixture;
(c) molding, optionally comprising mechanically dewatering, at least a portion of said mixture to form a shaped greenware body; and
(d) drying said greenware body to form said article;
where neither said molding mixture nor said greenware body is treated with saturated steam to effect further hydrothermal reaction.

The present invention also comprehends the products of this method.

DETAILED DESCRIPTION OF THE INVENTION

Any suitable calcareous and siliceous reactants may be used to form the aqueous slurry of the invention. While the Ca:Si atom ratio in these reactants is not critical, it is preferably kept not substantially greater than 1:1 in order to avoid the presence of any substantial proportion of unreacted CaO or $Ca(OH)_2$ in the product. If it is desired that the calcium silicate hydrate binder be principally in the form of tobermorite crystals, then the Ca:Si atom ratio should be about 0.8:1, while if xonotlite crystals are desired, the ratio should be about 1:1 and reactive aluminum compounds, which interfere with the formation of xonotlite crystals, should be kept to very low concentration in the slurry. At intermediate atom ratios, a mixture of tobermorite and xonotlite crystals can be produced.

Any of a wide variety of known siliceous reactants may be employed, including such materials as diatomaceous earth, ground perlite and similar materials, but the preferred material is fumed silica. It has not been found desirable to treat the siliceous reactant with an alkali silicate, as has sometimes been recommended for enhancing its reactivity with the calcareous reactant. Preferably, the siliceous reactant should be predominantly in the form of particles no larger than about 44μ, i.e., passing through a standard No. 325 mesh sieve.

Any of the usual calcareous reactants may be employed, but it is preferred to employ quicklime slaked to produce a large surface area, e.g., about 40,000 to 60,000 $cm^2/g$. This may be accomplished by pulverizing quicklime to pass a standard 44μ (No. 325) mesh sieve, mixing this pulverized quicklime with about 4 times its weight of water preheated to at least about 100° F. (38° C.) and more preferably at least about 120° F. (49° C.).

The calcareous and siliceous reactants are mixed together with sufficient water to form a fluent slurry. The weight ratio of water:solids in the reactive slurry is preferably about 15:1 to about 30:1 and more preferably about 20:1 to about 25:1. If the reactive slurry is too concentrated, the hydrothermally reacted gel derived therefrom will be difficult to remove from the autoclave reactor. The lower limit to the water:solids ratio imposed by this effect will vary somewhat with the nature of the reactants, and especially of the siliceous reactant, and adjustment may be required when different reactant materials are to be employed, but normally dilution of the slurry beyond about 25:1 will not be required.

The slurry can be hydrothermally reacted by heating to at least 100° C. at super-atmospheric pressure in a suitable stirred autoclave reactor for a period sufficient to produce a gel of calcium silicate hydrate crystals. While the hydrothermal reaction conditions can be varied considerably, it has been found that good results can be obtained with a slurry having water:solids ratio of about 23:1 by maintaining autogeneous steam pressure at about 217 psig, corresponding to a temperature of about 387° F. (197° C.), for about 75 minutes, followed by slow depressurization and cooling over a period of several hours. The higher the temperature, and the corresponding saturated steam pressure, the shorter will be the time required to achieve any desired degree of conversion of the reactive slurry to a gel of calcium silicate hydrate crystals, and vise versa.

While it is possible to heat and pressurize the slurry by introducing saturated steam, this may require appropriate adjustment of the initial water:solids ratio of the slurry to take account of water absorbed into the slurry by condensation from steam so introduced. It is preferable to employ a reactor provided with a heater or heat exchanger so that it can be heated without introducing steam into the contents in order that this dilution by condensate may be avoided, the internal pressure being then the result of the autogenous generation of saturated steam from the slurry itself as it is heated. Since only very little of the slurry water will be converted to steam under these conditions, and much of that may be recondensed into the resultant gel upon depressurizing the reactor, little or no adjustment in the initial water:solids ratio will ordinarily be required and the final water:solids ratio will be much more easily and consistently reproduced in successive batches so that uniform product can more readily be produced therefrom. Any subsequent processing of the gel should avoid such vigorous agitation as to cause the gel structure to degrade excessively.

Small amounts of fibrous reinforcement may be mixed with the gel, if desired, and it is ordinarily preferable to incorporate a mixture of longer, e.g., about 1 to 2 cm, and shorter fibers in order to secure the most effective reinforcement of the product while minimizing any impairment of the flowability of the gel due primarily to longer fibers. Such fibrous reinforcement may be selected from the materials used in prior art calcium silicate hydrate products, such as wood or other cellulosic fibers. mineral fibers, glass fibers, fibers of such synthetic organic polymers as rayon, cellulose esters or polyethylene terephthalate, or other similar materials, and mixtures of different fibrous materials. It is preferred that at least some hygroscopic fibers such as wood fibers be present. If glass fibers are employed, they should be of an alkali resistant composition or treated with an alkali resistant coating unless the calcium silicate hydrate gel is formulated and reacted so as to substantially eliminate any unreacted lime or other alkali which is corrosive to ordinary glass fibers. (While asbestos fibers are well-known as reinforcement for the prior art unfilled calcium silicate hydrate products and would probably provide very satisfactory reinforcement for the filled products of the present invention, concern over possible adverse health aspects would militate against their use except under conditions which would ensure that no serious adverse health consequences would accrue therefrom.) The amount of such fibrous reinforcement can advantageously be from about 0.5 to about 10 percent by weight, based on the weight of calcium silicate hydrate solids in the gel, although more or less may be incorporated if desired.

While in principle the fibrous reinforcement may be incorporated at any stage of the process where the batch is still fluent, the fibers are usually most conveniently added to the gel before incorporation of the expanded aggregate, either as a predispersed aqueous slurry, if additional water is to be incorporated, or by simply blending them with the gel in the same equipment which will be used to incorporate the expanded aggregate.

Small amounts of such optional additives as filter aids, mold release agents, silicone or other water-repelling agents, infrared opacifiers, etc., may be incorporated if desired.

The gel, ordinarily and preferably containing any fibrous reinforcement and other additives that are to be employed, can be blended with the expanded inorganic aggregate by any suitable means. The use of a conventional ribbon blender to incroporate the expanded aggregate into the gel will ordinarily be found convenient for this purpose. The texture of the resulting molding composition will vary somewhat, depending on the size and density of the expanded aggregate, the structure of the gel and the relative proportion thereof, the amount and character of any fibrous reinforcement and of any other additives, and the amount of water incorporated. However, the molding composition will ordinarily and preferably be a fluent slurry which will easily flow into and fill the mold to be used. The overall water:solids ratio in the molding composition is not critical, but will preferably be from about 15:1 to about 20:1.

The expanded inorganic aggregate will preferably be expanded perlite, but any other suitable expanded inorganic particulate material such as expanded vermiculite may be used. Such expanded aggregate can be produced from suitable particulate inorganic material by heating and such processes (colloquially designated as "popping") and the equipment for carrying them out to produce suitable expanded aggregate are well-known. The use of perlite expanded to a bulk density of about 2.5 to 3 lb/ft$^3$ is preferred, especially where the density of the final product is to be less than about 15 lb/ft$^3$. Expanded perlite of such light bulk density have been referred to as cryogenic grade, reflecting its established usefulness as loose-fill insulating material for structures intended to contain fluids at so-called cryogenic temperatures. Although the particle size of the expanded aggregate is not critical, it is preferred that excessive fines or dust be avoided. Expanded aggregate of which at least about 80 percent by weight is retained on a 150μ (No. 100) standard size is preferred.

The relative proportions of expanded aggregate and binder in the final product can vary over a wide range, but weight ratios of expanded aggregate to binder (as calcium silicate hydrate solids) from about 50:50 to about 70:30 are preferred, especially for light-weight products having densities up to about 15 lb/ft$^3$ made with light-weight expanded aggregate having bulk densities up to about 3 lb/ft$^3$. Since the final dried density of the binder may vary somewhat when different siliceous and calcerous reactants are employed, as well as with the Ca:Si atom ratio, the amount of water, fibrous reinforcement and other optional components and with the shaping and drying procedures, a certain amount of experimentation will ordinarily be required to achieve a predetermined product density with any given combination of ingredients and process limitations. However, any such experimentation need be neither extensive nor unduly burdensome.

The molding mixture can be shaped by any suitable means, including pan molding, filter press molding or core shooting. For simple pan molding, the water:solids ratio should ordinarily be kept as low as possible consistent with sufficient fluency of the molding mixture to fill the mold without excessive assistance from tamping, vibration or similar expedients, since in pan molding all of the excess water must be removed by evaporation which is a time-consuming and/or energy intensive procedure. Shaping methods wherein the molding mixture is at least partially mechanically dewatered are preferred. Such methods include filter press molding wherein aqueous medium is mechanically expressed through an open or porous portion of the mold as the molding mixture is compressed therein, substantially similar to the well-known filter press molding of partially reacted calcium silicate hydrate gels which do not contain expanded aggregate as filler. The degree of compression, or the amount of a given molding mixture charged into a given mold for pressing to a given volume, will, of course, directly affect the final density of the dried product. Care should be taken that the compression called for in any particular situation does not result in excessive crushing of the expanded aggregate, for this will tend to reduce its effectiveness in contributing to the thermal insulating properties of the final dried product.

The shaped greenware body resulting from the molding procedure is then simply dried to form the final rigid product. If a filter press or other suitable compression molding procedure has been employed, it will ordinarily be possible to remove the greenware body from the mold before drying, in contrast to pan molding procedures where the ware will ordinarily require support of the mold during at least an initial portion of the drying process. The drying of shaped greenware bodies out of the mold can preferably be accomplished by exposing them to circulating air at a temperature of about 150° to about 200° C. for about 2 to about 6 hours per inch of thickness. Preferably, the ware is dried until the moisture content is reduced to about 15 to about 35, and more preferably from about 20 to about 30 percent, of the bone-dry weight thereof. Under typical atmospheric conditions, the moisture content of the final product will ordinarily drift slowly to even lower values during shipment and storage.

Any deviation in dimensions of the final product from that of the mold in which it was shaped will ordinarily be very minor, but if exceptionally close tolerances are desired, these deviations can be easily determined and compensated for in designing production molds. Upon exposure to successively higher temperatures, some shrinkage and degradation of other properties will become increasingly evident and will determine, for any given product, the limiting temperature which can be tolerated in regular use. The products of the present invention will ordinarily be found to be suitable for regular use at temperatures at least as high as about 1200° F. (649° C.), and in many cases as high as 1500° F. (815° C.) or even 1800° F. (982° C.) or in some cases even higher. Especially noteworthy is that it has been found that the products of the present invention are frequently satisfactory for regular use at temperatures much higher than are comparison products of substantially the same density which have been derived from the same gel in substantially the same manner except without incorporating the expanded aggregate. In many cases, the effect of incorporation of the expanded aggregate is quite dramatic, the comparison product exhibiting linear shrinkage of 25% or even more, where the product of the invention made from the same gel exhibits linear shrinkage of less than 2% upon exposure for the same time to the same temperature or, in some cases, even upon exposure for the same time to a temperature several hundred Fahrenheit degrees higher.

The following example will illustrate the practice of this invention. Parts and percentages are by weight unless otherwise indicated.

EXAMPLE 8.33 parts of lime were slaked for 10 minutes in a hydrapulper with 33 parts of water preheated to 120° F. (49° C.), and then transferred to a stirred, jacket-heated autoclave reactor containing 322 parts of water. 8.67 parts of fumed silica were then dispersed in 60 parts of water in the hydrapulper for 3 minutes and added to the reactor followed by 10 parts of wash water from the hydrapulper so that the total water in the slurry was 425 parts.

The reactor was then sealed and the contents heated with stirring until the autogenous pressure reached 217 psig, corresponding to a temperature of 387° F. (197° C.). These conditions were maintained for 75 minutes, followed by slow depressurization by cooling the sealed reactor.

Portions of this gel were blended first with equal amounts of rockwool and softwood pulp and then with thermally expanded perlite of bulk density about 3 lb/ft$^3$ on a conventional ribbon blender to make molding mixtures according to the following Table 1.

TABLE 1

| Molding Mixture | Parts Gel | Parts Rockwool | Parts Pulp | Parts Perlite |
|---|---|---|---|---|
| A | 12.2 | 0.0220 | 0.0220 | 0.22 |
| B | 16.4 | 0.0275 | 0.0275 | 0.22 |
| C | 5.7 | 0.0220 | 0.0220 | 0.55 |
| D | 9.8 | 0.0275 | 0.0275 | 0.55 |

The rockwool fibers were broken down to lengths of about 3 to about 6 mm during blending and the wood fibers were about 2 mm in length.

Several block samples of about 7×17 inches and 1.5 inches thick were pressed in a conventional filter press mold from each of these molding mixture formulations, removed from the mold and dried overnight in a circulating air oven at 350° F. (178° C.). Specimens of these samples, when held for 24 hours at 1200°, 1500° and 1800° F. (649°, 815° and 982° C.), exhibited linear shrinkage as shown in Table 2.

TABLE 2

| Molding Mixture | Sample Density | Percent Linear Shrinkage | | |
|---|---|---|---|---|
| | | 1200° F. | 1500° F. | 1800° F. |
| A | 9.48 | 0.31 | 0.55 | — |
| B | 12.51 | 0.31 | 0.61 | — |
| C | 8.35 | 0.38 | 1.05 | — |
| D | 10.52 | 0.32 | 0.72 | 1.86 |

While the thermal and mechanical properties of these samples were satisfactory, their resistance to impact could have been enhanced by substituting polyethylene terephthalate fibers of about 2 cm length for the shorter rockwool fibers.

Numerous variations and modifications of the invention as described will be apparent to those skilled in the art, and it is intended that this invention comprehend such variations and modifications.

We claim:

1. A method for making a shaped rigid article of thermal insulation which undergoes less than 2% shrinkage within the temperature range of 1200°–1800° F., comprising the steps of:
   (a) heating an aqueous slurry of calcareous and siliceous reactants at a temperature of at least 100° C. under superatmospheric pressure to form, by hydrothermal reaction thereof, a gel of calcium silicate hydrate crystals;
   (b) mixing additional material comprising thermally expanded inorganic aggregate with said gel to form a molding mixture;
   (c) molding, optionally comprising mechanically dewatering, at least a portion of said mixture to form a shaped greenware body; and
   (d) drying said greenware body to form said article;
   where neither said molding mixture nor said greenware body is treated with saturated steam to effect further hydrothermal reaction.

2. A method according to claim 1 wherein the weight ratio of water to solids in said slurry is about 15:1 to about 25:1 and is maintained substantially constant throughout the hydrothermal reaction thereof to form said gel.

3. A method according to claim 1 wherein the proportions of said calcareous and siliceous reactants in said slurry correspond to a Ca:Si atom ratio of about 0.8:1 to about 1:1.

4. A method according to claim 1 wherein said thermally expanded aggregate comprises a major portion by weight of thermally expanded perlite.

5. A method according to claim 1 wherein the bulk density of said thermally expanded aggregate is not greater than about 3 lb/ft$^3$.

6. A method according to claim 1 wherein the amount of said thermally expanded aggregate mixed with said gel is from about 1 to about 2.5 times the weight of the calcareous and siliceous reactants in the slurry from which said gel was formed.

7. A method according to claim 1 wherein the ratio of water to solids in said molding mixture is about 15:1 to about 20:1 by weight.

8. A method according to claim 1 wherein said molding mixture further comprises up to about 10 percent by weight, based on calcium silicate hydrate solids, of fibrous reinforcement.

9. A method according to claim 8 wherein said fibrous reinforcement comprises predominantly fibers at least about 1 cm long.

10. A method according to claim 1 wherein said molding mixture further comprises up to about 2 percent by weight, based on total solids, of an organic water repellant material.

11. A method according to claim 1 wherein at least about 80 percent by weight of said thermally expanded aggregate will be retained by a standard 150 μm mesh (No. 100) sieve.

12. A method according to claim 1 wherein the molding step comprises dewatering said molding mixture by mechanically expressing aqueous medium therefrom.

13. A method according to claim 12 wherein said greenware body is removed from the mold in which it was shaped promptly following completion of said molding and prior to said drying.

14. A method according to claim 1 wherein said drying comprises exposing said greenware body to circulating air at a temperature of about 150° to about 200° C. for about 2 to about 6 hours per inch of thickness of said greenware body.

15. A method according to claim 1 wherein said greenware is dried by exposure to heated air until the moisture content of said article is reduced to about 15 to about 35 percent of the bone-dry weight thereof.

16. A method according to claim 1 wherein the density of said article is about 5 to about 15 lb/ft$^3$.

17. A method according to claim 1 wherein said article will suffer not more than about 2 percent linear shrinkage upon exposure for 24 hours in an oven maintained at about 1800° F. (982° C.).

* * * * *